United States Patent [19]

Mirlieb et al.

[11] Patent Number: 5,073,916
[45] Date of Patent: Dec. 17, 1991

[54] CASSETTE UNLOADING AND RELOADING APPARATUS WITH FILM DETECTING SENSORS

[75] Inventors: Bernd Mirlieb, Fellbach; Kurt Baumann, Ostfildern; Heinz Killguss, Kornwestheim, all of Fed. Rep. of Germany

[73] Assignee: Eastman Kodak Company, Rochester, N.Y.

[21] Appl. No.: 445,861

[22] PCT Filed: May 9, 1988

[86] PCT No.: PCT/EP88/00402
§ 371 Date: Nov. 8, 1989
§ 102(e) Date: Nov. 8, 1989

[87] PCT Pub. No.: WO88/09001
PCT Pub. Date: Nov. 17, 1988

[51] Int. Cl.$^5$ .............................................. G03B 42/02
[52] U.S. Cl. ...................................... 378/181; 378/182
[58] Field of Search .............. 378/172, 173, 177, 181, 378/167, 206, 182; 361/173

[56] References Cited

U.S. PATENT DOCUMENTS

| 4,329,589 | 5/1982 | Stievenart et al. | 378/181 |
| 4,338,522 | 7/1982 | Stievenart et al. | 378/173 |
| 4,426,724 | 1/1984 | Cutter | 378/181 |
| 4,541,173 | 9/1985 | Sakuma et al. | 361/173 |
| 4,663,774 | 5/1987 | Saffer | 378/181 |
| 4,760,589 | 7/1988 | Siczek | 378/181 |
| 4,791,282 | 12/1988 | Schmidt et al. | 378/181 |
| 4,845,733 | 7/1989 | Dieterlen et al. | 378/177 |
| 4,887,284 | 12/1989 | Bauer et al. | 378/173 |

Primary Examiner—Edward P. Westin
Assistant Examiner—Kim-Kwok Chu
Attorney, Agent, or Firm—G. Herman Childress

[57] ABSTRACT

Method and apparatus for use in X-ray cassette unloading and loading apparatus, including novel detection of presence or absence of film in the cassette and the position thereof in the upper or lower cassette part, utilizing radiation, such as infra-red, to which the film is not sensitive. Radiation is directed into each cassette part after opening and the radiation reflected from the respective parts is compared. The radiation means, as well as means for holding the cassette parts in open position and air jet means for releasing film from the upper cassette portion, are all mounted on parallelly moving guide members which engage the lateral edges of the cassette to position it.

11 Claims, 6 Drawing Sheets

CASSETTE UNLOADING AND RELOADING APPARATUS WITH FILM DETECTING SENSORS

TECHNICAL FIELD

This invention relates to apparatus for unloading and loading X-ray cassettes of the type having upper and lower parts for enclosing the film, which parts are moved apart to open position for unloading and loading film. More particularly, the invention relates to a novel method and apparatus for determining the loaded/unloaded condition of the cassette and the location of a film therein, as regards whether it is in the upper or lower part of the cassette, and whether a film of proper size is in the cassette. The novel apparatus in a preferred embodiment is mounted on parallelly movable guide members which engage the lateral edges of the cassette to position it, and which guide members also carry means for holding the cassette parts in open position, and air jet means for separating film from the upper cassette part.

Film location and presence or absence of film are determined by directing into each cassette part, when open, radiation harmless to the film that is, having no adverse effect on the film, such as a physical or chemical reaction, infrared radiation being preferred. The radiation is differentially reflected according to the presence or absence of film in that cassette part. Comparison of the radiation reflected from the respective cassette parts then indicates the presence or absence and location of film in the cassette.

BACKGROUND ART

An apparatus is known (DE-OS 33 06 720, U.S. Pat. No. 4,541,173) in which an X-ray film cassette is positioned between two parallelly guided bars pulled together by a tension spring and is transported by means of motor-driven rollers on a receiving plate towards an end abutment in a cassette unloading and reloading station. The bars have vertically shiftable claws at their free ends located in the area of the end abutment, said claws serving to open the locking means of the upper cassette portion, when the receiving plate and thus the X-ray film cassette are moved to an inclined position, as well as to hold down the lower cassette portion on said receiving plate.

An infrared-light sensor with an associated light-receiving element is arranged above the front area of the X-ray film cassette when said cassette is in its functional position, the infrared light rays of that sensor sensing a point on the inner surface of the lower cassette portion when the upper cassette portion is pivoted to its open position in order to ascertain whether a film sheet is present or not. If there is no film sheet present, the X-ray film cassette is fed out of the apparatus in its open condition.

This known apparatus is disadvantageous in that when the upper cassette portion is pivoted to its open position, the film sheet adheres to the inner surface of the upper cassette portion owing to static charges of the film sheet in surface-to-surface contact with the inner surface of the plastic lining of the upper cassette portion. The film sheet is only released after a period of time and then drops back into the lower cassette portion. If during the adherence of the film sheet to the upper cassette portion in its open position, the lower cassette portion is sensed by infrared light, no film sheet is detected in the lower cassette portion so that the X-ray film cassette in its open position along with the film sheet adhering to the upper cassette portion may be erroneously fed out. If several sensing operations were performed at intervals, with the last one ascertaining that a film sheet was present, having been released from the upper cassette portion in the meantime and dropped back into the lower cassette portion, this operation would take much too long.

If a film sheet of small size is erroneously loaded in an X-ray film cassette of large size the film sheet will be detected even if only one single point in the lower cassette portion is sensed. However the detection does not reveal whether it is of a size suitable for the X-ray film cassette.

Finally, the infrared-light sensor is arranged at a great distance above the X-ray film cassette. This remote arrangement of the infrared-light sensor is necessary because the sensor would otherwise be contacted, and damaged by the upper cassette portion when said portion is pivoted to its open position.

DISCLOSURE OF THE INVENTION

The present invention eliminates the many disadvantages of the prior art and provides rapid, reliable operation. Novel features include the manner in which radiation is used to determine the loaded/unloaded condition of the cassette, as well as determining the location of a film in the cassette, and determining whether film in the cassette is of proper size. The operational parts necessary for the above determinations, for holding down the lower part of the cassette, for holding in open position the upper part of the cassette, and air jet means for separating film adhering to the upper part of the cassette, all are conveniently mounted on guide members which are parallelly movable and engage the lateral cassette edges to position the cassette. The arrangement is space saving and provides ready access to the cassette for the means for opening the cassette. These means conventionally may be a suction device which engages the upper surface of the upper part of the cassette.

In a preferred embodiment, the radiation means comprises a pair of infra-red emitters and sensors cooperating with deflecting mirrors for directing the radiation into the upper and lower cassette parts when the cassette is open. The radiation is differentially reflected to the sensors, depending upon whether or not a film is in one part of the cassette. Additional mirror-like means are located in the cassette parts to enhance reflectivity in the absence of a film in a cassette part. These mirror-like means comprise spaced portions in each cassette part, so that a wrong size film which is too small for that cassette will not cover both portions. In operation the radiation reflected from the respective cassette parts is compared, the difference in reflected radiation indicating the location of a film, whereas if there is no difference, there is no film in either part of the cassette.

All of the apparatus mounted on the guide members is always brought into cooperation with a cassette at the proper locations, regardless of the cassette size and the devices which open and close the cassette and move it into and out of the apparatus are not interfered with since the apparatus of the invention is mounted on the guide members on each side of the cassette.

BRIEF DESCRIPTION OF THE DRAWINGS

The invention will be better understood by reference to the following specification and the appended drawings, in which.

MODES OF CARRYING OUT THE INVENTION

Figure 1:
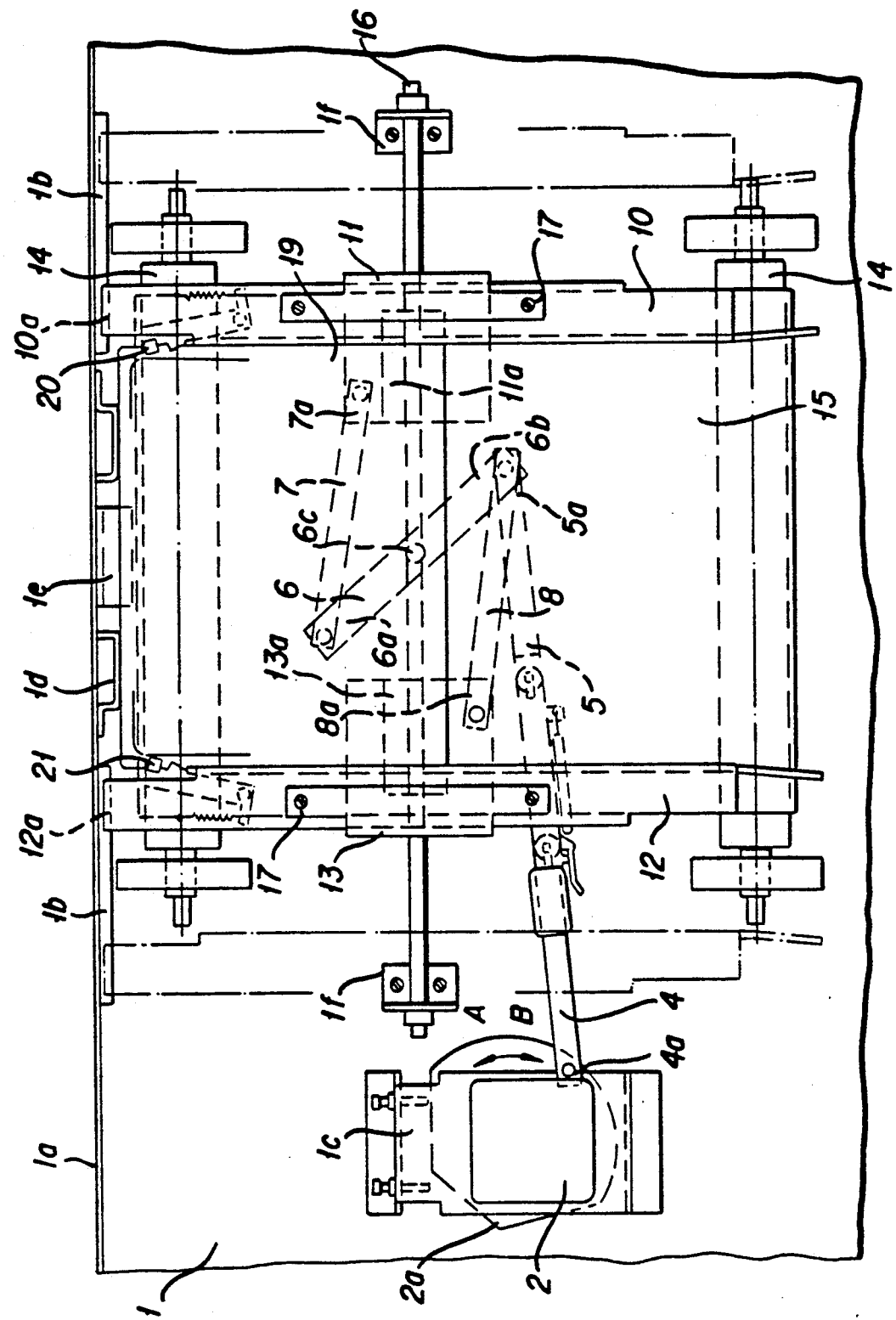
FIG. 1 is a plan view of a cassette-positioning device consisting of two parallelly guided bars movable towards and away from each other.

In an apparatus 1 for unloading exposed film sheets from X-ray film cassettes of different sizes and reloading the same cassettes with unexposed film sheets, a device for positioning the X-ray film cassettes is provided in the area of the unloading and reloading station. This positioning device comprises two parallelly guided members 10 and 12 movable towards and away from each other above transport belt 15 which transports an X-ray film cassette 19 from an input point to the unloading and reloading station. The transport belt 15 is placed about two shafts 14 one of which is driven.

Figure 6:
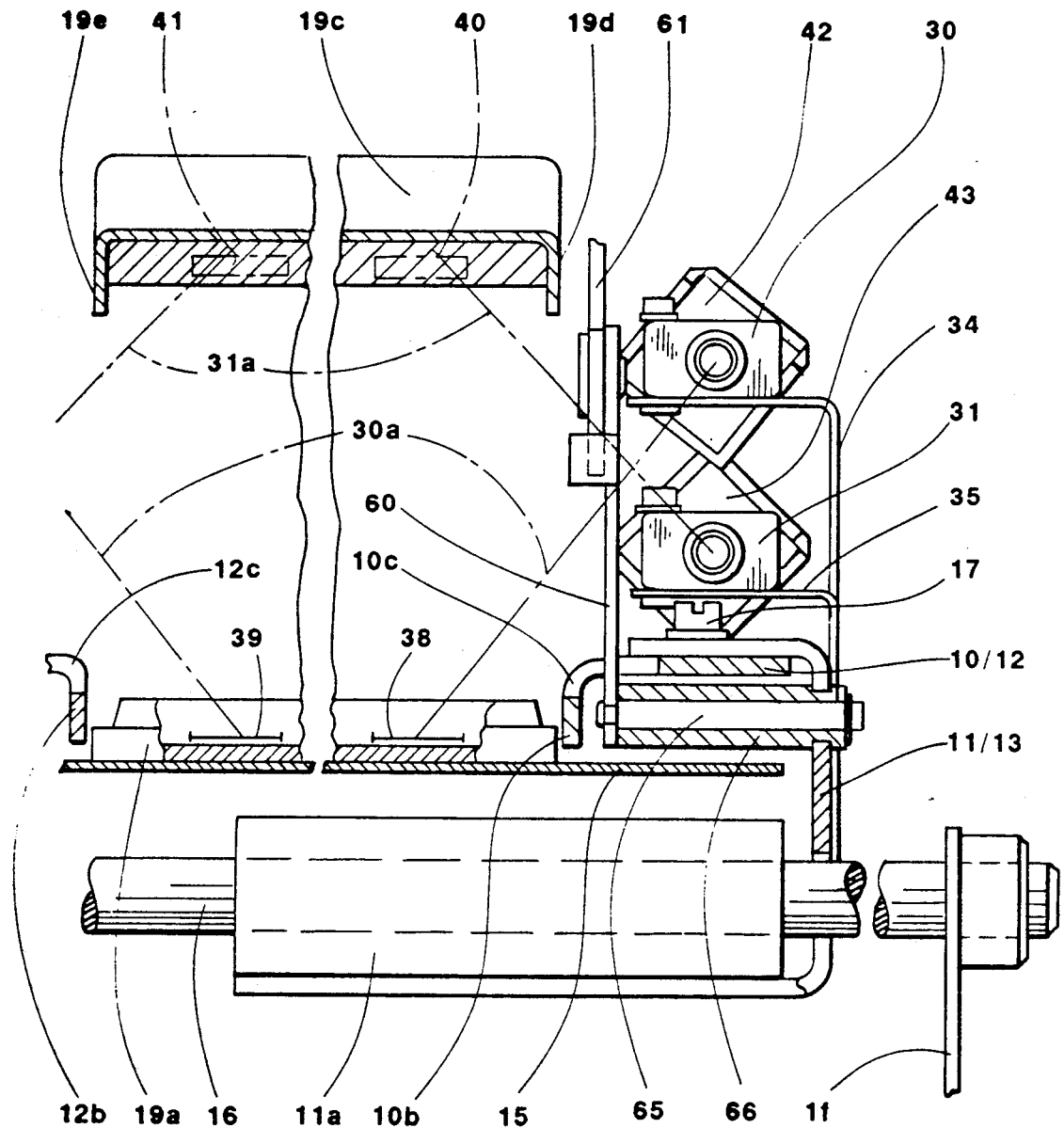
FIG. 6 is a sectional view along line IV—IV of part of the positioning device according to FIG. 3, with an infrared-light sensing device arranged on one bar and with part of the film sheet releasing device.

As shown in particular in FIGS. 1 and 6, members 10 and 12 are fixed to angle plates 11 and 13 by means of screws 17. Each angle plate 11, 13 is shiftably mounted by means of a guide sleeve 11a, 13a on a guide shaft 16 held between two mounting angles if provided on the apparatus. At the end of the members 10 and 12 extending into the interior of the apparatus, guide grooves 10a and 12a are provided by means of which the members 10 and 12 are additionally guided for sliding movement on guide rails 1b arranged on an intermediate wall 1a of the apparatus. The numeral 1e denotes a cassette abutment ramp situated on the intermediate wall 1a and the numeral 1d two cassette abutments fixed to said intermediate wall.

For actuating the two members 10, 12, a symmetrical lever arrangement is provided which is located between said members and consists of a two arm lever 6 centrally mounted for pivotal movement about a stationary pin 6c. A first lever arm 7 extending to the right is hinged to one free lever end 6a and a second lever arm 8 extending to the left is hinged to the other free lever end 6b. The free ends 7a and 8a of the two lever arms 7 and 8 are hinged to the angle plates 11 and 13 supporting members 10 and 12.

A drive motor 2 is mounted on a mounting angle 1c provided on the apparatus. On a crank disk 2a seated on the motor shaft and movable by the motor in the directions "A" and "B", the free end 4a of a portion 4 of a rod is hinged which consists of two portions 4 and 5 movable relative to each other. The other free end 5a of portion 5 of the rod engages directly the hinge between lever 6 and lever arm 8 pointing to the left.

Figure 2:
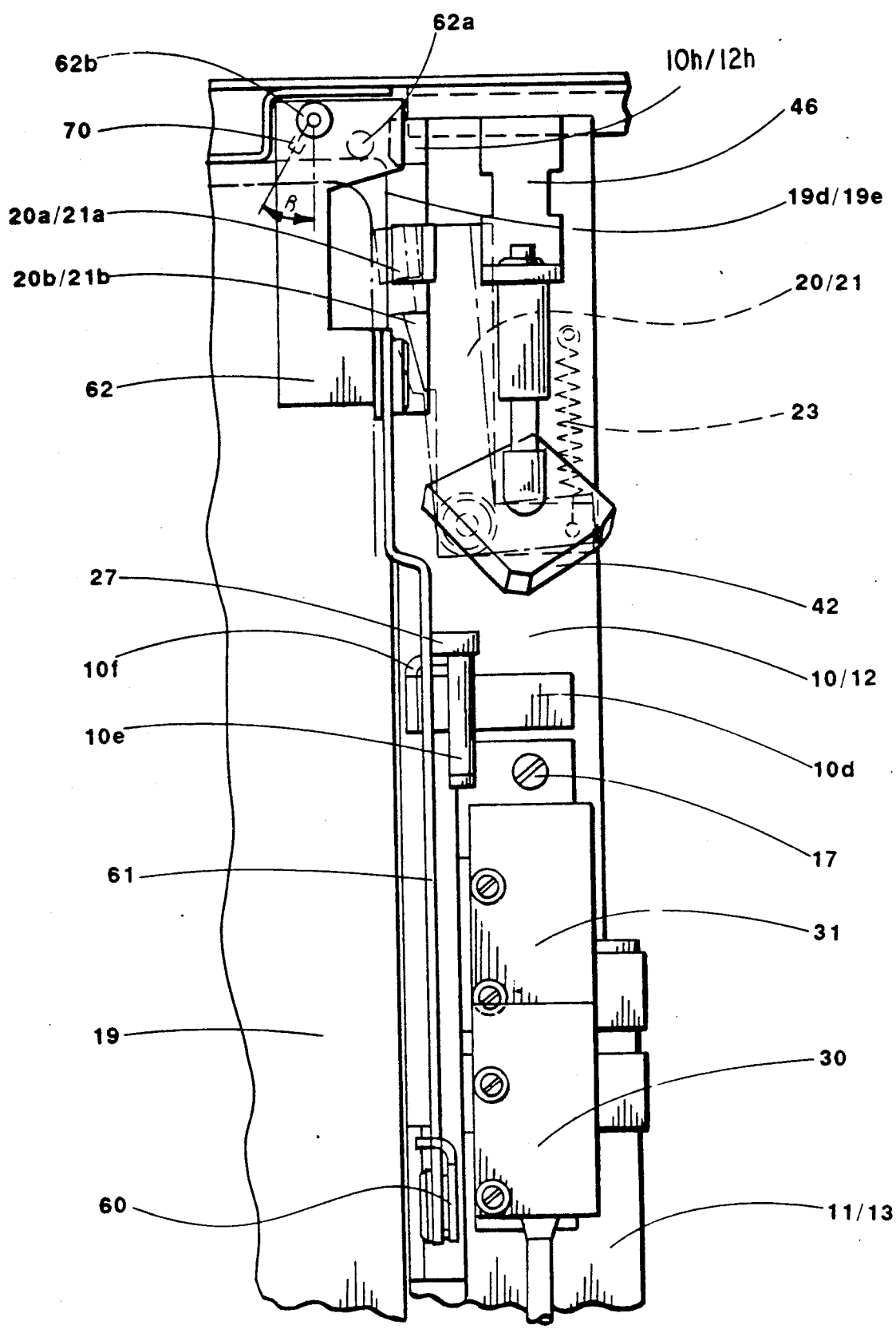
FIG. 2 is a plan view of part of the positioning device according to FIG. 1 including the devices according to the invention, with the upper cassette portion pivoted to its closed position.
Figure 3:
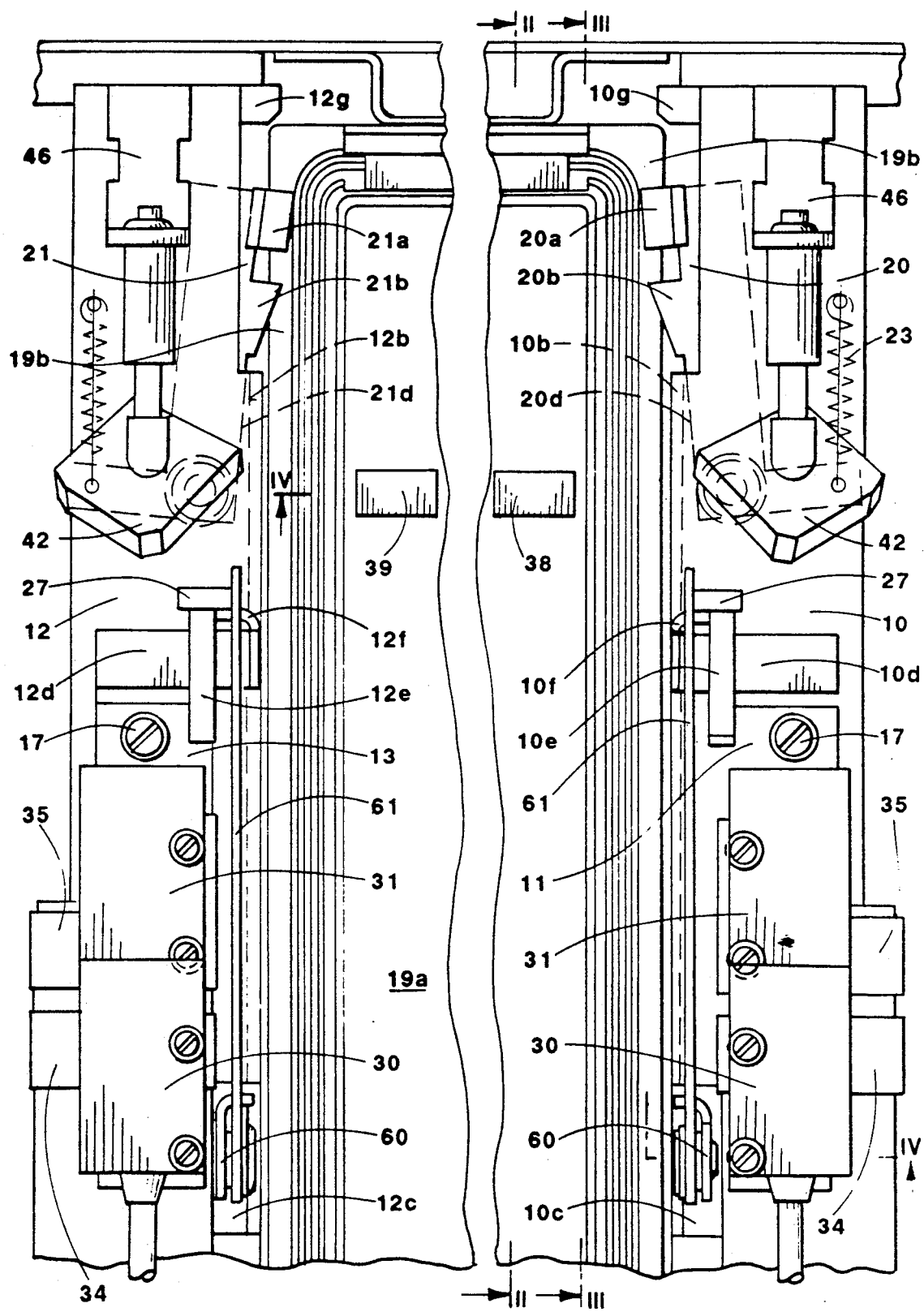
FIG. 3 is a plan view of part of the positioning device according to FIGS. 1 and 2 including the devices according to the invention, with the upper cassette portion pivoted to its open position.

In the area of each of the two ends of the two members 10, 12, which extend into the interior of the device, a hold-down lever 20 and 21 is mounted which can be pivoted into, and out of the transport path of an X-ray film cassette (FIGS. 2 and 3). Each hold-down lever comprises a control arm 20a and 21a. These arms extend upwardly (FIG. 5) and are slightly inclined outwardly in the direction towards the members 10, 12 so that they form inclined control surfaces facing the side walls of the upper cassette portion 19c. A hold-down nose 20b, 21b is provided on each hold-down lever 20, 21. Both hold-down levers 20 and 21 are biased by a tension spring 23 in the direction of their inward pivotal movement. The hold-down levers rest with their inner surfaces 20d and 21d against bent-off portions 10b and 12b of members 10 and 12.

X-ray film cassettes of various sizes are used. In the case of the embodiment, shown only an X-ray film cassette 19 of small size is illustrated. If such an X-ray film cassette 19 is introduced with the opening front edge of the upper cassette portion 19c into the input slot of the apparatus and transported from the input point to the unloading and reloading station, motor 2 is switched on by switch means not illustrated in detail when the front side of the cassette contacts one of the abutments 1d, said motor actuating the symmetrical lever arrangement 6, 7 and 8 by means of crank disk 2a rotating in the direction "A" and link 4.5 hinged thereto. Members 10 and 12 are thus moved from their initial position shown in dash-dotted lines in FIG. 1 towards each other to assume a position in which they rest against the side walls of the cassette so that the X-ray film cassette is aligned and exactly positioned.

Directly before members 10 and 12 contact the cassette side walls, the control arms 20a and 21a of the hold-down levers 20 and 21 make contact with the side walls of the upper cassette portion 19c. Each of the hold-down levers 20 and 21 is pivoted back to the position illustrated in FIG. 2 by this contact. When the upper cassette portion 19c is pivoted to its open position by means not illustrated, the hold-down levers 20 and 21 are biased into engagement with the lower cassette portion 19a and their inclined control arms 20a and 21a rest against the side walls 19d and 19e of the upper cassette portion 19c. In this position of the two hold-down levers, the inner surfaces 20d and 21d once again rest against the bent-off portions 10b and 12b of the bars 10 and 12, and the hold-down noses 20b and 21b are in a position above the stepped edge 19b of the lower cassette portion 19a (FIG. 3).

After exposed film sheets have been unloaded from the X-ray film cassette and the cassette has been reloaded with unexposed film sheets, the side walls of the upper cassette portion 19c slide along the inclined control arms 20a and 21a when said portion is closed, the inclined position of the control arms causing the hold-down levers 20 and 21 to become disengaged from the lower cassette portion 19a.

Figure 5:
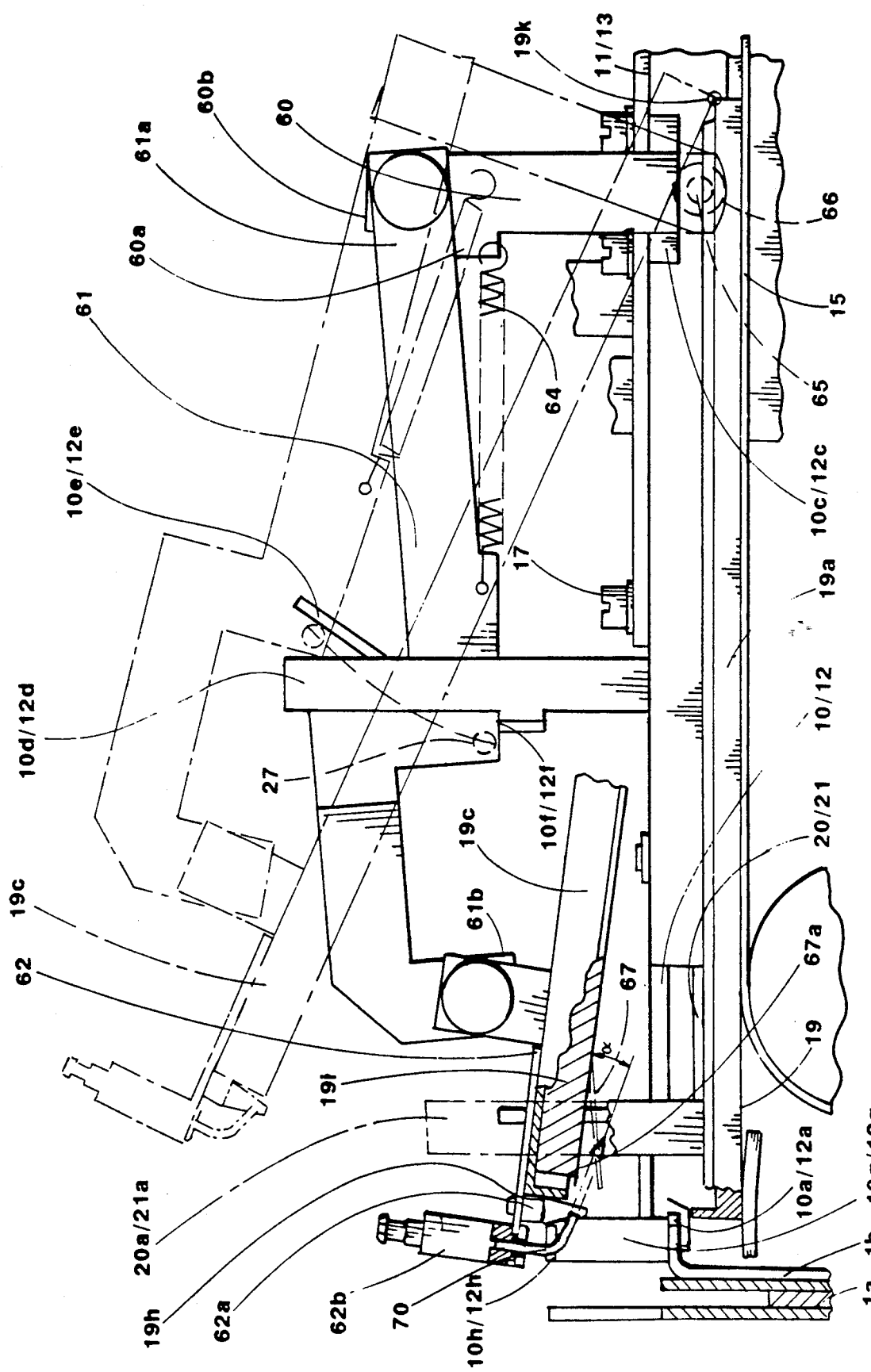
FIG. 5 is a sectional view along line III—III of part of the positioning device according to FIG. 3, with a film-sheet releasing device arranged on one bar.

According to a further useful modification of the apparatus, a multiple-lever arrangement 60, 61 and 62 is hingedly connected to the two members 10, 12, the last-mentioned member 62 of said arrangement carrying an air nozzle 70 as will be described in detail below (FIGS. 2 and 5). For this purpose a bushings 66 are fixed to the angle plates 11 and 13 supporting the members 10 and 12 (FIG. 6). Pins 65 are rotatably mounted in the bushing 66. Each of the pins 65 is provided with a vertically upright first lever arm 60 extending through a recess 10c and 12c in each bar 10 and 12. A second lever arm 61 is hingedly connected to the free end 60b of each lever arm 60 (FIG. 5), said second lever arm being held in contact with an abutment 60a by the force of a tension spring 64 and extending approximately at right angles to the direction of the opening front edge of the upper cassette portion 19c. The last member 62 of the lever arrangement is hinged to the free end 61d of lever arm 61 and extends into the path of movement of the pivotable upper cassette portion 19c when the bars 10 and 12 rest against the side walls of the cassette. Member 62 carries the air nozzle 70 and a pin 62a riveted adjacent to said nozzle.

The second lever arm 61 and the last member 62 of each multiple-lever arrangement rest loosely on support means arranged on the two bars 10 and 12. The support means for the second lever arm 61 consists of a first angle portion 10d and 12d, each provided with a support surface 10f and 12f, respectively, and the support means for the last member 62 consist of a second angle portion 10g and 12g, respectively, provided with a support surface 10h and 12h respectively (FIGS. 2 and 5). The first angle portions 10d and 12d each comprise a sheet-metal guide 10e and 12e extending upwardly in an inclined position and cooperating with sensing pin 27 arranged on the second lever arm 61 such that the multiple-lever arrangements assume a predefined initial position relative to the front end surface 19h of the upper cassette portion 19c.

When the upper cassette portion 19c of the X-ray film cassette 19, which is centered in its functional position in the unloading and reloading station by means of members 10 and 12, is pivoted to its open position shown in dash-dotted lines in FIG. 5 by means not illustrated, the front end surface 19h of the upper cassette portion 19c slides after only a small distance along pin 62a until the upper cassette portion 19c abuts against the lower surface of the last member 62 which makes contact with the upper cassette portion 19c. When the upper cassette portion is further pivoted to its open position, the multiple-lever arrangments 60, 61 and 62 are also pivoted by rotating about pin 65. During this operation sensing pins 27 located on the second lever arms 61 move away from the sheet-metal guides 10e, and 12e of support angles 10d, 12d so that the multiple lever arrangements are only held by means of pin 62a engaging the end surface 19h of the upper cassette portion 19c and pressing against that end surface due to the action of spring 64.

The air nozzle 70 is arranged as shown in FIG. 5 in a holder 62b fastened to the last member 62 so as to be shiftable in the vertical direction and rotatable in the horizontal direction. Its end piece is bent off in the direction towards the end surface 19h of the upper cassette portion 19c. The bending angle "$\alpha$" is 5 to 15 degrees. As can be seen in FIG. 2, the end piece of the air nozzle 70 is also inclined in the horizontal by an amount of "$\beta$" of about 20 to 40 degrees with respect to the direction in which the X-ray film cassette 19 is introduced.

While the upper cassette portion 19c is being pivoted to its open position indicated in dash-dotted lines, air is blown through the nozzle 70 for a period of about 0.3 to 0.5 seconds. By adjusting of the air nozzle 70 in the vertical direction, a position is defined in which the bent-off portion is aligned with respect to the support plane of the film sheet 67 such that an air jet is directed approximately tangentially past the front edge 67a of a film sheet 67 still adhering to the inner surface of the film-sheet support 19i of the upper cassette portion 19c.

Due to a difference in the pressure of the air stagnant in the area above the film sheet's front edge 67a projecting from the film-sheet support 19i and the air moved at high speed as a result of the sharp air jet directed tangentially past the front edge 67a of the film sheet and continuing to flow below the film sheet 67, a directional force is obtained which acts downwardly on the upper side of the projecting film sheet 67 so that the front edge section of film sheet 67 is separated downwardly. At that moment, part of the substantially slower air stream surrounding the sharply directed air jet can reach the space between film sheet 67 and film-sheet support 19i so that film sheet 67 is promptly and readily released from the film-sheet support 19i of the open upper cassette portion 19c and drops back into the lower cassette portion 19a. Subsequently the exposed film sheet is withdrawn from the lower cassette portion and fed into a development station by means not shown, while a fresh, unexposed film sheet is fed into the lower cassette portion. After the upper cassette portion has been pivoted to its closed position, the X-ray film cassette is transported out of the apparatus.

As shown in FIG. 5, hinge 19k of the pivotable upper cassette portion 19c of an X-ray film cassette 19 of small size is situated in the region of pin 65 of the mounting of the multiple-lever arrangement. Owing to the small length of the upper cassette portion 19c, the spring-biased second lever arm 61 hinged to the upright first lever arm 60 when the upper cassette portion is pivoted to its open position. The multiple-lever arrangement 60, 61 and 62 is at the same time only pivoted about pin 65 in that the upright lever arm 60 is pivoted rearwardly by a distance corresponding to the opening angle of the upper cassette portion 19c.

Due to its hinged connection the multiple-lever arrangement 60, 61 and 62 can always be brought into contact with the pivotable upper cassette portion with its last member 62, even in the case of upper cassette portions of X-ray film cassettes of different sizes, and is held at the end sides of the upper cassette portions, and pivoted along when such upper cassette portions are pivoted to their own positions. As a result the air nozzle 70 is held in its functional position irrespective of the opening angle of the pivoted upper cassette portions.

Finally infrared-light emitting and sensing devices with associated radiation deflecting means are provided on each of the two members 10 and 12.

Figure 4:
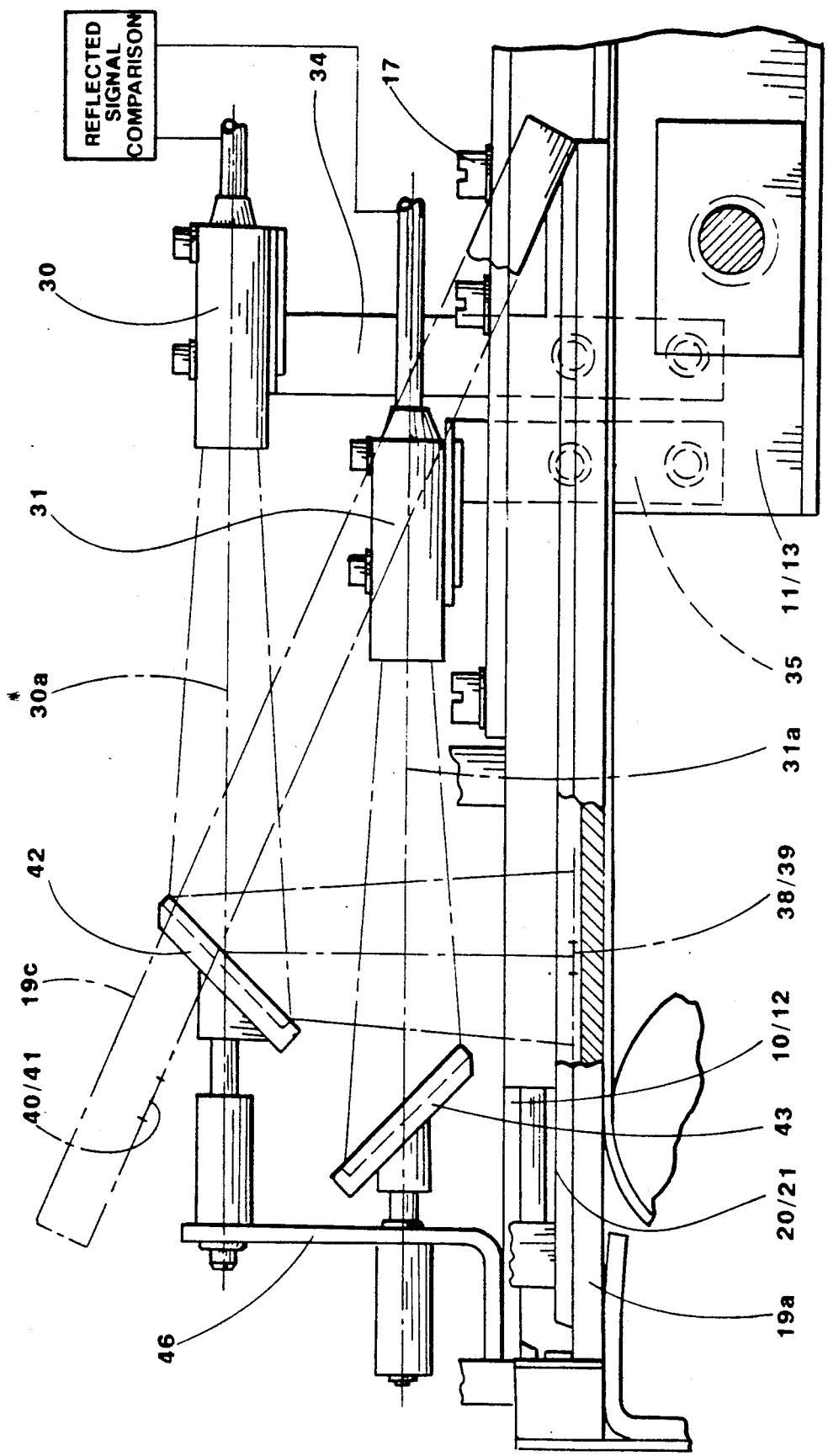
FIG. 4 is a sectional view along line II—II of part of the positioning device according to FIG. 3, with an infrared-light sensing device arranged on one bar.

As shown in FIGS. 3, 4 and 6, two mounting brackets 34 and 35 of different heights are arranged on the angle plates 11 and 13 which support the members 10 and 12. An infrared-light emitter 30 and 31 with an associated light receiving element is screwed to each of these two mounting brackets 34 and 35. The devices are connected to a device for comparing the radiation received by the respective sensors.

Another mounting bracket 46 is provided at the free ends of each of the two members 10 and 12 which extend into the interior of the apparatus. Each of the mounting brackets 46 supports two mirrors 42 and 43 arranged above each other in the raypath of the two infrared-light emitters 30 and 31. The mirrors are inclined such that when the X-ray film cassette is pivoted to its open position, the rays 30a emitted by the upper two infrared light emitters 30 are directed via the upper two mirrors 42 into the lower cassette portion 19a and the rays 31a emitted by the lower two infrared-light emitters 31 are directed via the lower two mirrors 43 into the upper cassette portion 19c.

In both the lower cassette portion 19a and the upper cassette portion 19c, two small reflecting pieces of highly reflective material, such as foil 38, 39 and 40, 41 are arranged in the measuring range of the infrared-light sensors, said pieces of foil having higher reflecting power than a film sheet. The two foil pieces are spaced apart or otherwise located so that too small a piece of film will for the cassette not cover both pieces.

As soon as the upper cassette portion 19c has been pivoted to the open position shown in dash-dotted lines (FIGS. 4 and 5), during which operation both the cassette hold-down levers 20 and 21 are pivoted inwardly, and the film sheet 67 still adhering to the open upper cassette portion 19c is pneumatically released—as will be described further below—the infrared-light devices 30 and 31 are actuated to sense the lower and upper cassette portions 19a and 19c. If the film sheet 62 has dropped into the lower cassette portion 19a as desired, its presence is signalled by a particular signal difference in the sensor receiving reflected radiation from film sheet 62 covering the reflecting pieces of foil 38 and 39 in the lower cassette portion 19a, and the signal received by the other sensor from the uncovered pieces of foil 40 and 41 in the upper cassette portion 19c. If the film sheet has not been released from the upper cassette portion 19c, the opposite signal difference, this time between the free uncovered pieces of foil 38 and 39 in the lower cassette portion 19a and the pieces of foil 40 and 41 still covered by the film sheet 62 in the upper cassette portion 19c, indicates that the film sheet is not yet in the lower cassette portion.

If no film sheet is present in the X-ray film cassette, this is indicated by a uniform reflection signal of all four uncovered pieces of foil.

If a film sheet of small size is erroneously loaded in an X-ray film cassette of large size, this film sheet can assume a position in the lower cassette portion in which either none of the two pieces of foil 38 and 39 or only one piece of foil is covered.

As a result of the space-saving arrangement of all devices on the members 10 and 12 of the cassette-positioning device, these devices are always brought into engagement at the same point of an X-ray film cassette loaded in the unloading and reloading position independently of the size of the cassette.

Moreover, the cassette hold-down device, which becomes operative when the upper cassette portion is pivoted to its open position, the pneumatic film-sheet releasing device used, and the immediately following infrared-light sensing of the lower upper cassette portions ensure that all functions take place promptly, reliably and without any problems at the beginning of the cassette unloading operation.

The invention has been described with reference to a preferred embodiment. However, it will be appreciated that variations and modifications can be effected within the ordinary skill in the art without departing from the scope of the invention.

We claim:

1. Apparatus for unloading and loading X-ray cassettes in which film is enclosed between upper and lower cassette parts which are moved apart to an open position for unloading and loading film, comprising:
    a source of radiation harmless to the film and differentially reflected by the film and by the cassette parts in the absence of film therein;
    means for directing said radiation into the respective cassette parts after said parts are in said open position;
    means for detecting said radiation reflected from the respective cassette parts; and
    means for comparing the amounts of radiation reflected from the respective cassette parts.

2. Apparatus according to claim 1, further comprising reflective means located on the inner surfaces of the cassette parts so as to reflect said radiation, said reflective means being positioned so as to be covered by a film in that part.

3. Apparatus according to claim 2 said reflective means in each cassette part comprising spaced portions located so as to leave a portion of the cassette part exposed to radiation when an undersized film is in that cassette portion.

4. Apparatus for unloading and loading X-ray cassettes in which film is enclosed between upper and lower cassette parts which are moved apart to an open position for unloading and loading film, and in which cassettes are positioned by guide means which engage the lateral edges of the cassette, the improvement comprising:
    means mounted on said guide means for detecting the loaded/unloaded condition of the cassette and the film position if loaded, said detecting means comprising means for emitting and sensing radiation harmless to the film.

5. Apparatus according to claim 4, wherein said radiation emitting and sensing means direct radiation into the respective cassette parts in their open positions and compare the amounts of radiation reflected from said respective cassette parts.

6. Apparatus according to claim 4, further comprising reflective means on the inner surfaces of said cassette parts to reflect said radiation, said reflective means being positioned so as to be covered by a film in that part.

7. Apparatus according to claim 4, further comprising means carried by said guide means for holding the cassette parts in open position; and
    air jet means carried by said guide means for separating the film from said upper cassette part.

8. A method for examining the interior of an X-ray cassette to determine the presence and location of a film therein, the cassette having a lower part and an upper part, the two parts being separated for unloading and loading film thereinto, comprising
    directing into the interiors of the respective parts, when separated, radiation harmless to the film and differentially reflected according to the presence or absence of a film in that part; and
    comparing the radiation reflected from the respective cassette parts.

9. Apparatus as set forth in claim 1, wherein said radiation is infrared radiation.

10. Apparatus as set forth in claim 4, wherein said radiation emitting means enits infrared radiation.

11. A method as set forth in claim 8, wherein said radiation is infrared radiation.

* * * * *